(12) United States Patent
Wilding

(10) Patent No.: US 6,601,188 B1
(45) Date of Patent: Jul. 29, 2003

(54) METHOD AND APPARATUS FOR EXTERNAL CRASH ANALYSIS IN A MULTITASKING OPERATING SYSTEM

(75) Inventor: Mark Francis Wilding, Toronto (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/430,362

(22) Filed: Oct. 28, 1999

(51) Int. Cl.[7] ............................................... G06F 11/00
(52) U.S. Cl. ........................... 714/15; 714/38; 702/185
(58) Field of Search ............................. 714/34, 37, 38, 714/39, 51, 23, 15; 717/124, 127; 708/530; 702/185

(56) References Cited

U.S. PATENT DOCUMENTS

| | | | |
|---|---|---|---|
| 4,486,831 A | | 12/1984 | Wheatley et al. |
| 4,870,644 A | | 9/1989 | Sherry et al. |
| 5,056,091 A | * | 10/1991 | Hunt ........................... 371/14 |
| 5,159,597 A | * | 10/1992 | Monahan et al. .......... 371/16.1 |
| 5,224,206 A | | 6/1993 | Simoudis |
| 5,228,039 A | | 7/1993 | Knoke et al. |
| 5,526,485 A | | 6/1996 | Brodsky |
| 5,581,695 A | | 12/1996 | Knoke et al. |
| 5,657,253 A | | 8/1997 | Dreyer et al. |
| 5,678,003 A | * | 10/1997 | Brooks ..................... 395/193.1 |
| 5,838,897 A | | 11/1998 | Bluhm et al. |
| 5,954,825 A | * | 9/1999 | Kaiser et al. .................. 714/43 |
| 6,009,258 A | * | 12/1999 | Elliot ..................... 395/500.43 |
| 6,151,569 A | * | 11/2000 | Elliot ........................... 703/22 |
| 6,356,960 B1 | * | 3/2002 | Jones et al. ..................... 710/5 |
| 6,389,557 B1 | * | 5/2002 | Yu et al. ........................ 714/34 |

\* cited by examiner

*Primary Examiner*—Robert Beausoliel
*Assistant Examiner*—Marc Duncan

(57) ABSTRACT

The invention provides a method, and a program for investigating the operation of processes of an application program running on a multitasking operating system of a computer system to determine if any of the processes have stopped for a predetermined exception incident, by: identifying to the operating system a plurality of predetermined exceptions to be investigated; instructing said operating system to stop a process when it encounters one of the predetermined exception incidents; scanning the computer system periodically for stopped processes; determining whether a stopped process has been identified as having encountered a predetermined exception incident; and performing a predetermined action if the process has encountered a predetermined exception incident.

12 Claims, 3 Drawing Sheets

METHOD AND APPARATUS FOR EXTERNAL CRASH ANALYSIS IN A MULTITASKING OPERATING SYSTEM

FIELD OF THE INVENTION

This invention relates to methods of analysis of defects (debugging) in an operating system for computers, which is especially useful for debugging a multitasking operating system which supports multiple processes concurrently and lacks the support for registering a call back function through the operating system's exception handler.

BACKGROUND OF THE INVENTION

Debugging an application is an integral part of its development. A considerable amount of resources are spent testing an application before it is considered ready for the market. During testing, it is common to have numerous test cases which are run against the product in order to flush out as many bugs as possible. If a test case fails due to an application exception, it is often difficult to recreate the problem inside of a debugger. In order to catch an exception in a debugger, the debugger must be attached to the running process and run along with it in memory. Also, if the application has multiple processes a debugger must be in control of each of the processes in case one of them encounters an exception. When running a large number of test cases, this quickly becomes a problem.

Unfortunately, program exceptions still sometimes occur on a customer's system. Because of this, remote debugging is also an important part of the software industry. Program exceptions can occur for a number of reasons including operating system bugs, hardware failures, and program defects.

When a program receives an exception at a customer site, it is often on a production system and getting the problem diagnosed and resolved expeditiously is very important. One of the main inhibitors of quick resolution is the lack of accurate information. Stopping a process in the exact state of the exception is both very useful and can be done for multiple processes.

Once a process has been stopped, then information such as the virtual memory (including the stack and heap), register dumps and libraries for the process can be dumped into files which can then be packaged up and sent back to the vendor or the product.

Windows® has a feature which allows a program to register itself for use with the operating system exception handler. This program will then get called in the event that an exception occurs. The program can then choose to attach a debugger or other program to the process which caused the exception. For operating systems which do not support the registration of a call back function with the operating system this can be done by using other methods. In the Sun Microsystem Solaris Operating Environment (an operating system), a set of signals or a set of faults can be traced which has the effect of stopping the process if it encounters one of the signals or faults in the set. This can be done for any number of processes.

When the operating system detects an exception, it stops the process in the exact state that caused the exception. A monitor program such as comprised in the invention described below can then detect that the process has stopped and dump relevant information as well as notify the user that a process has stopped. If the process which has stopped due to an exception is on a development system a debugger can be attached. If the process resides on a customer system, the monitor program can dump the process's information which can then be sent to a developer for further study.

By using the operating system's ability to stop a process in the event that it hits an exception, a set of processes can be "watched" or monitored by a single external program. In the event that one of the monitored processes stops due to an exception, the monitor program can then take action. The resulting action of the monitor program is configurable and depends on the specific need of the user.

If the user of the monitor program is a developer, then dumping information for the trapped process may not be necessary. Instead, the monitor program can be run such that it does not dump any information but only notifies the user that a process has stopped. The developer can then attach a debugger to the process and gather information about the exception through the debugger.

Debugging a exception remotely such as at a customer's site is often a difficult undertaking. Typically, an application will install a signal handler for each process which can then dump out relevant information such as a stack trace, register dumps, etc. This type of signal handler gets called when certain signals are encountered, usually indicating a program exception. This information is then sent back to the vendor where debugging is attempted. One of the problems with this method is that a signal handler is called which changes the process from it's original state where it received the exception making some of the information stale. Another problem is that sometimes the stack trace for a process is corrupted and the process is not able to dump relevant information for itself. Since this form of debugging is remote, attaching a debugger is often not possible.

In the case of remote debugging, the monitoring process can initiate dumping of the process's virtual memory, call stack, current registers, etc. This information is dumped into files created under a directory structure which can then be packaged up and sent back to the vendor. The information can include but is not limited to: virtual memory, register dumps, call stack, reason for dumping, and libraries which were loaded during the exception.

Currently debuggers are designed to control one process and its children. Controlling a related set of processes entails attaching multiple debuggers, one per process or attaching to the first process and allowing the debugger to follow each child as needed. Even in the case where the debugger follows each child, one debugger is needed for each process which is expensive on the system resources. This method can change the environment enough to prevent the occurrence of the exception of interest.

If the system is remote and the starting of a debugger is not an option, the application has to rely on the signal handlers to dump as much information as possible. As previously mentioned, this method can be unreliable and the information for the process can be somewhat stale.

In contrast to the UNIX operating environment, in Windows an operating system exception handler is provided with which a debugging utility can register itself with in order that the debugging utility can be notified when an application running under the operating system encounters an exception. An exception can be due to a hardware fault or an illegal machine instruction or invalid memory access which can cause an interruption to the operation of the application program.

U.S. Pat. No. 5,526,485 assigned to Microsoft Corporation appears to disclose a debugging system in which the monitor program registers itself with the operating system, to be called by the operating system in response to exceptions generated by an application program running on the operating system. When called in this manner, the monitor program first checks to see if a debugging program is already running. If one is, the monitor program returns and the operating system calls any remaining registered programs, such as the running debugging program. If there are no running debugging programs, the monitor program loads and starts a debugging program to debug the previously loaded application program. This is distinguishable from the present invention which does not require the monitor program to register itself with the operating system, and is not called by the operating system in response to an exception.

Presently, for the UNIX operating system and other UNIX-like or UNIX derived operating systems like SOLARIS, or AIX, HP-UX, IRIX, etc. there is no support for the registering of a monitor program utility with the operating system. Accordingly if an exception occurs in the running of an application or process in these operating systems only that application or process is notified of the exception. No notification is made to other processes or applications by the operating system itself (except in the case of an attached debugger). Because of this limitation debugging multiple processes or applications running under these operating systems can be difficult. In the case of a single or limited number of processes it is possible to provide for debugging of the processes when an exception occurs if a debugger is attached to each process. "Attached" in this context is defined as using operating system provided api's (application programming interfaces) to gain control of the process so that when an exception occurs in the process, the operating system sends a notification to the debugger that an exception has occurred (ie. that a process to which the debugger is attached has changed states); the debugger then can inform the user of the debugger that an exception has occurred and await further instructions from the user.

As may be appreciated when a larger number of processes are running simultaneously the attachment of one debugger to each process results in an unwieldy number of debuggers and inefficient and time consuming procedure for the user. The user would either have to attach a debugger to each process - - - time consuming, or set the debugger used to spawn a new debugger for each process . . . 400 debuggers for 400 processes.

In order to overcome these difficulties the following invention was developed. In one embodiment of the invention only a single monitor program is required to detect whether any process has stopped due to an exception.

SUMMARY OF THE INVENTION

One aspect of the invention provides a method of investigating the operation of processes of an application program running on a multitasking operating system of a computer system to determine if any of the processes have stopped for a predetermined exception incident, including: identifying to the operating system a plurality of predetermined exceptions to be investigated; instructing the operating system to identify a process that has stopped when it encountered one of the predetermined exception incidents; scanning the computer system periodically for stopped processes; determining whether a stopped processes has been identified as having encountered a predetermined exception incident; and performing a predetermined action if the process has encountered a predetermined exception incident. The scanning is preferably resumed after sending the notification. An application may be provided if necessary to allow the stopping of a process from running if it encounters an exception. The operating system will not leave the process in a stopped state if the process encounters an exception which is not one of the predetermined exceptions.

The predetermined action may preferably include any of the following:

Notifying a user of the exception incident,
Notifying another program of the exception incident,
Starting another program,
Dumping information relating to the exception incident encounter to another program or file; or continue the process. The other program may preferably be a debugging program.

Another aspect of the invention provides a program product for operation on a computer system for investigating the operation of processes of an application program running on a multitasking operating system of the computer system to determine if any of the processes have stopped for a predetermined exception incident, including: a storage medium, a program routine stored on the storage medium for identifying a plurality of predetermined exceptions to be investigated; a program routine for instructing the operating system to identify a process that has stopped when it encountered one of the predetermined exception incidents, a program routine for scanning the computer system periodically for stopped processes; a program routine for determining whether a stopped processes has been identified as having encountered a predetermined exception incident; and a program routine for performing a predetermined action if the process has encountered a predetermined exception incident.

The routine for scanning may be adapted to cause resumption of scanning after sending the notification.

If the application program requires, a program routine can be provided for instructing the application program or operating system to stop a process from running if it encounters an exception.

The program product may include a routine for instructing the operating system to continue a process that has stopped without encountering any of the predetermined exceptions.

The predetermined actions preferably includes any of the following:

Notifying a user of the exception incident,
Notifying another program of the exception incident,
Starting another program,
Dumping information relating to the exception incident encounter to another program such as a debugging program or to a file; or restarting the process.

Aspects of this invention includes a method and apparatus including software for debugging an application or applications designed to run on an operating system such as UNIX which does not support the registering of a call back function through the operating system exception handler.

One embodiment of the method of the invention includes scanning processes of an application that are running on the operating system in a computer system. Under the method of the invention, when a process encounters an exception incident stopping the process from executing in the normal manner intended, the occurrence of the exception is detected by the operating system which sends a notification to the process of the exception incident that the process may be able to respond to if it later resumes operation. The operating system checks an exception list containing predetermined exception incidents, and if the exception encountered by the stopped process is not on the list attempts to continue the process (in this situation the process may die if it is incapable of handling the exception condition, or, if it can handle the exception it may continue operating, and signal the exception or dump information as is its capability). If the exception is on the exception list the process will be left in a stopped condition with the exception signal pending. The processes on the operating system are scanned periodically or at user discretion to determine if a process is stopped. If a process is identified which has stopped due to an exception, the monitor program can then send a signal to a user, for instance, informing the user of the stopped process, or to another program to causing dumping of process information to permit debugging.

Another embodiment of a method of the invention advantageously takes advantage of operating system features to allow a set of processes to stop if they encounter an exception, and to scan the set of processes to identify any which have stopped due to an exception, and dump information related to processes which have stopped. Another aspect of the invention includes three programs to facilitate this method of debugging: (a) a status advisor program which can give the status of a set of processes and informs the user if the process will stop upon receiving an exception; (b) a suspension program which can cause a set of processes to stop in the event that they are subject to an exception; and (c) a monitor program which monitors these processes and reports when they have stopped. The monitor program also has the capability dumping contents of registers, virtual memory, and other pieces of information that would be useful for debugging the process which received an exception. This information is placed into files making it convenient for the user of the program to package the information and send it back to the vendor of the product.

DETAILED DESCRIPTION OF THE INVENTION

The invention is useful on a computer running an operating system which is capable of running multiple processes concurrently, and which also has the ability to stop a process if the process encounters an exception. The operating system must support a method of checking for processes which have stopped and provides the ability to dump information for a process which has stopped.

Figure 1:
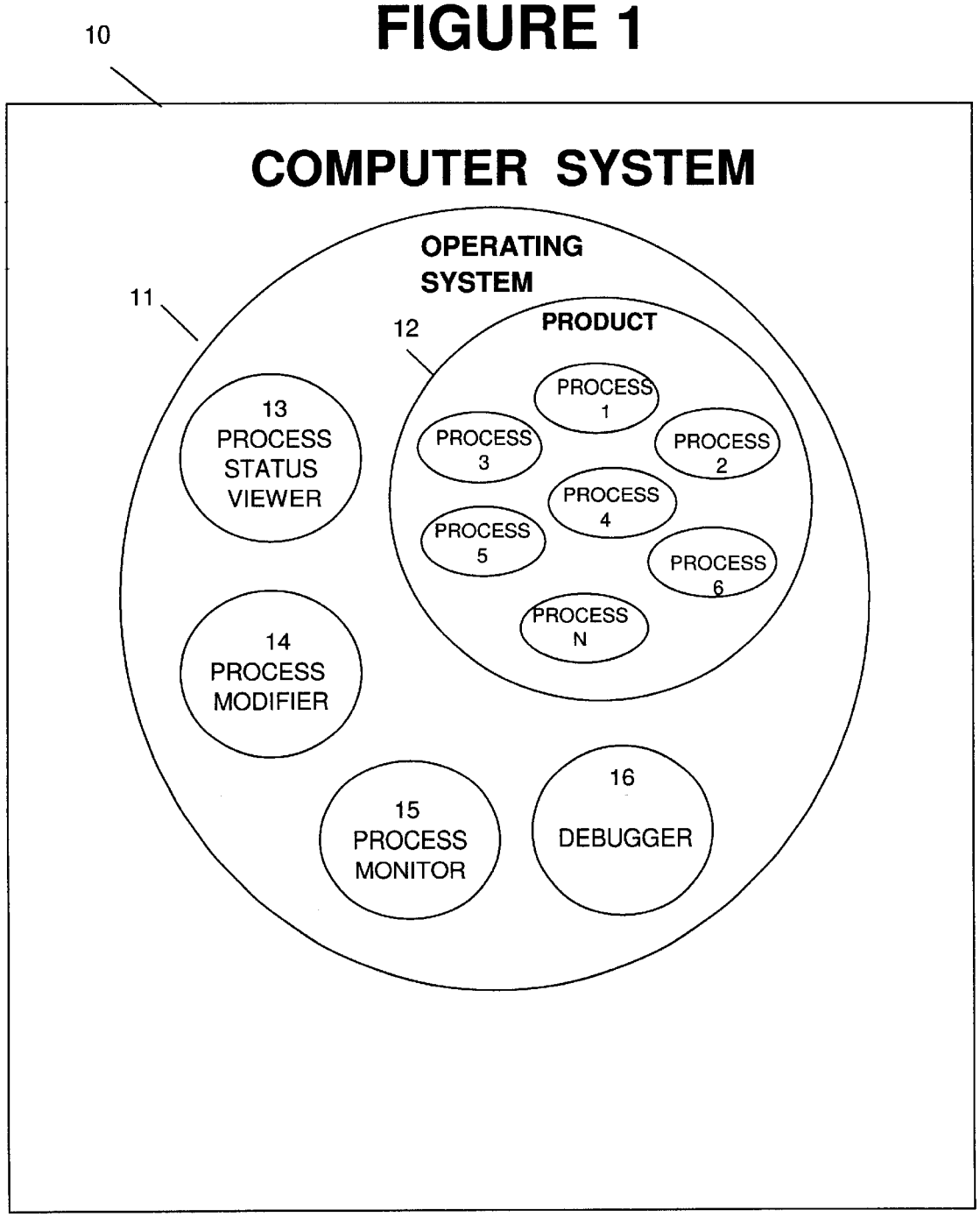
FIG. 1 depicts a computer system running an operating system with a number of processes.

FIG. 1 shows a computer system 10 running an operating system 11, with a number of processes including a set of processes 12 related to a specific product (such as a database application) or user. Also in FIG. 1 there are four other utilities, a process status viewer 13, which can determine the status of a process, a process modifier 14, which can operate on the process, a process monitor program 15, which can scan for the processes 12, and a debugger 16, which can be used in the analysis of the operation of the processes.

The following is a example of a supported configuration of one embodiment of the invention. The operating system of a supported configuration is a recent version of the Solaris Operating Environment, the application product is a recent version of a well known database management system (DBMS) adapted for use on the Solaris Operating Environment, and monitor program is a monitor program utility which can be used with the DBMS on the Solaris Operating Environment.

The referenced example operating system provides a number of methods for stopping a process on an exception. On Solaris, there is a process file system residing under the /proc file system. Solaris 2.5.1 in particular, has one file under the /proc file system for each process which is in memory and each filename under the /proc file system is the process id (pid otherwise known as the process identification number) of the process. The preferred method of enabling a process to stop when it encounters an exception is to use a traced signal set or a traced fault set via an ioctl system call which can request information from or send commands to a device or to files in the /proc file system. The method involves opening the process file system file which corresponds to a particular process. Then, using the file descriptor returned from the open system call, an ioctl system call is used with a PIOCSFAULT (a request that uses a list of faults to stop a process when one of the faults is encountered) or PIOCSTRACE (a request that uses a list of signals to stop a process when a listed signal is encountered) request. The method of enabling a process to stop is essentially the same whether done by an external process or by the process itself.

Information can also be obtained by opening the file via OPEN (an open system call) and using an ioctl system call on the file descriptor. Using an ioctl system call with the PIOCSTATUS request gives the process status which includes whether the process is stopped and if so why.

Figure 2:
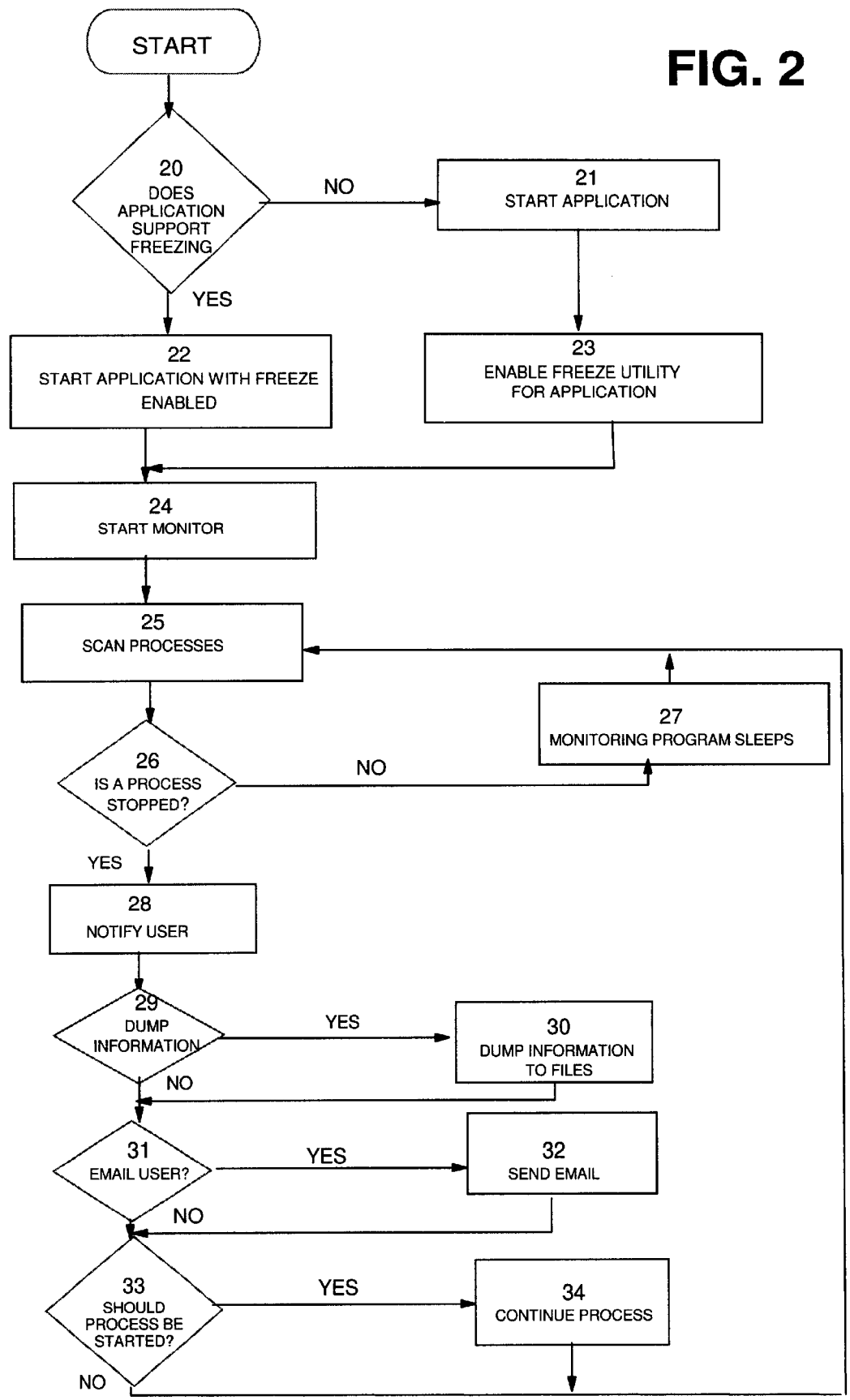
FIG. 2 depicts a flow chart of an embodiment of the invention.

FIG. 2 shows the method for this supported configuration. The procedure starts with step 20. The step following step 20 depends on whether the application supports enabling itself to stop on an exception. If the application can not enable itself to stop, then it can be started normally via step 21 and a separate program can be run via step 23 to ensure that the application will stop on an exception. In either case, by step 24, the application is running and will stop on an exception.

A DBMS running on Solaris capable of using its own proc file to enable it to freeze when it encounters an exception can be started with this enabled via an environment variable (e.g.. WATCH_ENABLED which is set to either "signals" or "faults") or other means to use either a set of signals or a set of faults.

If the DBMS on the other hand, does not support enabling itself to freeze, a freeze utility (e.g. freeze) is needed to enable all active DBMS processes to stop if they encounter an exception. This has the same effect as if the DBMS enabled itself except that it is somewhat less convenient. The freeze utility only needs to be run once after each startup and the changes will persists until the DBMS is stopped.

Steps 24 to 34 are representative of the monitor program. Step 24 signifies the starting of the monitor program. The monitor program uses very few resources and can remain in memory indefinitely. It is not like a debugger in that it does not have any special relationship with the processes. One monitor program can watch as many processes as needed.

Step 25 shows the monitor program scanning a specific set of processes. It can scan a specific set of processes or it can simply scan all of the processes on the system. Scanning in this context includes the checking of each process to see if it has stopped due to an exception, as shown in step 26.

There are a number of reasons that a process can stop including requests by a debugger or other programs. In this case, it is not appropriate to dump information but the user may still be notified.

At the end of each scan cycle is a sleep step 27, which serves to reduce the amount of CPU resources used by the monitor program. Without this sleep period, the monitor program would continuously scan, taking up CPU resources. Normally the monitor program consumes very few resources and its presence is negligible. The amount of time in seconds that the monitor program sleeps between scans is configurable as desired.

When a process is found which has stopped due to an exception, a message notifying the user, step 28, is displayed to the terminal of the monitor program. The message includes the process id and the reason why the process stopped. Depending on the startup switches given to the monitor program, the monitor program may dump various types of information, step 29, step 30. This information can include but is not limited to the call stack, register dumps, a core file and virtual memory.

The information on Solaris is gathered in a number of ways. Solaris provides some useful tools which reside under the /usr/proc/bin directory on Solaris systems. Among these tools, there is pstack, pmap, pldd, and pflags which the watch (monitor) program will launch to gather information. Some information is gathered directly via the ioctl system call on the process'/proc file. Another utility called gcore can be used to dump a core file for the process.

If reproducing an exception is expected to take a long time, an email can be sent step 31, step 32 to notify the user that a process is stopped and is ready to have a debugger attached. For the e-mail function to succeed, the system must be capable of sending e-mail.

A useful option of the watch program is to not dump anything at all. In this case, the user is just notified of the stopped process by a message displayed to the terminal with the process id and reason the process stopped. This can be used in conjunction with the option which tells the watch program not to continue the stopped process. When using the monitor program in this way, a debugger can then be attached to the stopped process. The debugger can be any debugger which supports attaching to a process. As mentioned before, if a debugger is not available, the information can be dumped by the monitor program and sent to a developer.

It may be desirable to try to continue the stopped process as shown in step 33, which may be useful if the process can carry on successfully. This can be set at the discretion of the user. Whether the stopped process is restarted or not, the monitor program will then continue to scan (see steps 34, and 25).

Figure 3:
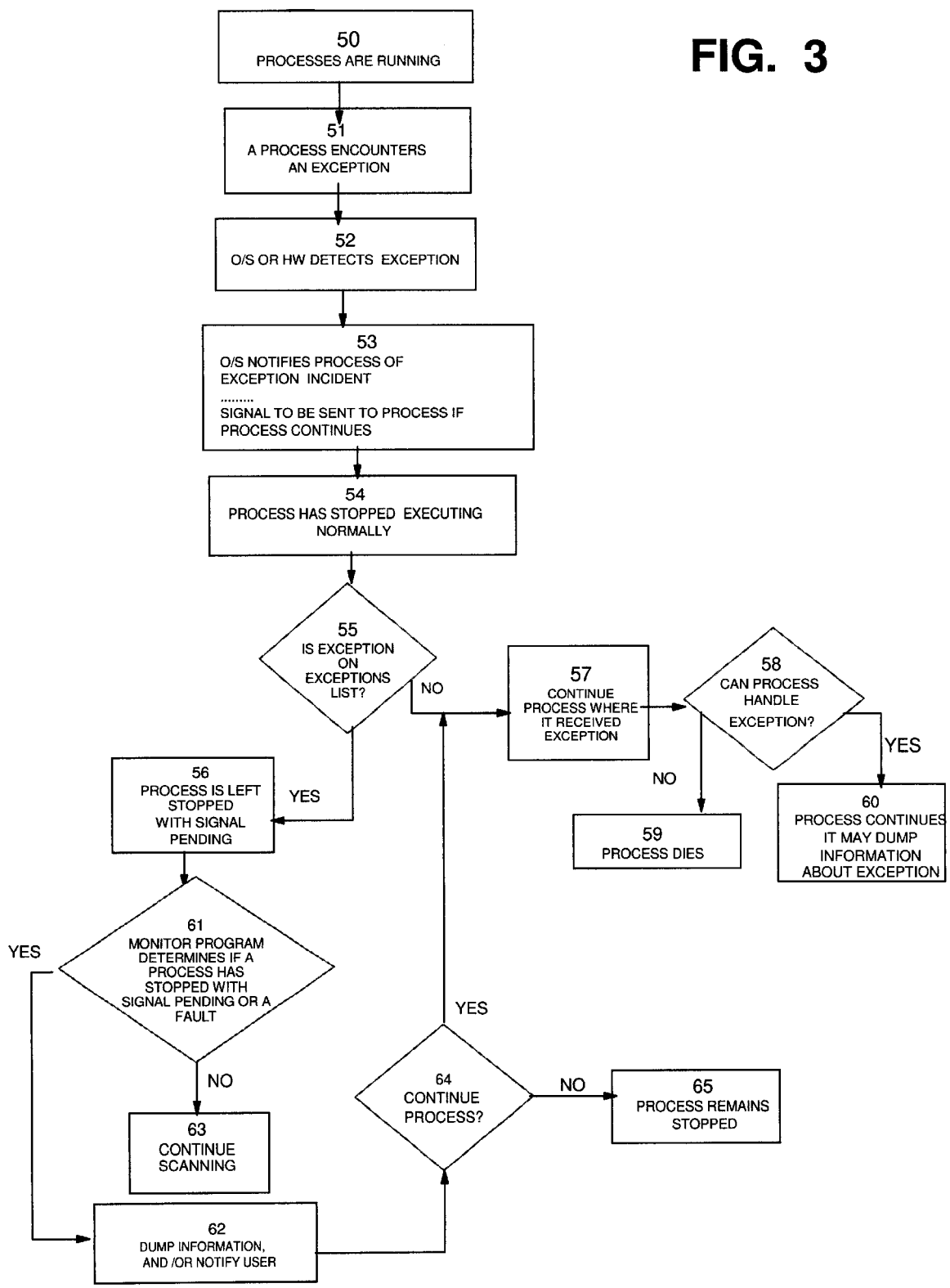
FIG. 3 depicts a flow chart of an embodiment of the invention describing processes operating on a computer.

FIG. 3 depicts an embodiment of the invention while monitoring processes that are running, stage 50, on the operating system of a computer. One (or more) process may encounter an exception, step 51, which is detected, step 52 (by the underlying operating system or hardware). The operating system notifies that process of the exception incident, step 53 and queues a signal to be sent to the process if it subsequently continues. At this point the process has stopped executing normally, step 54. If the exception is on an exceptions list that has been provided to the operating system, step 55, then the process will be left stopped with the signal pending, step 56.

If the exception is not on the predetermined exception list the process will be continued, step 57, by the operating system, if possible. If the process can handle the exception, step 58, the process can be allowed to continue, step 60, and may dump information to a file, for instance. The process may die if it is not capable of handling the exception, step 59. If, on the other hand, the process was left stopped with a signal pending, step 56, then the monitor program that has been scanning for stopped process, detects the stopped process, step 61, and can be used to notify a user or dump information so the exception circumstances can be analyzed, step 62. The monitor program can attempt to continue the process, as is desired, step 64. If the process is continued, then the process continues at step 57, otherwise it remains in a stopped state, step 65. If the process has not been stopped due to an exception in the form of either a signal or fault, the monitor program will continue scanning, step 63.

Pseudo code

Pseudo code is provided below that programmers skilled in the art of the invention can use to produce useful implementations of the invention.

The following pseudo code is useful in developing programming code to implement a method of stopping a process on a set of signals or faults and checking a process to see if it has stopped. The section on checking the process can be repeated for many processes if the watch program is specified to do so. Only one iteration is shown for simplicity.

This pseudo code is adapted for the Solaris operating system and is meant to illustrate the underlying support for the embodiment of the invention on the Solaris platform.

Setting a Process to Freeze

This section illustrates pseudo code for enabling a process to stop when it encounters an exception. In this context, an exception can occur as either a fault or as a signal which is sent by the operating system.

Setting Process to Freeze Pseudo Code
get the process's own process id (pid).
(130) pid=getpid( )
or get another process's pid.
make a string with the /proc file name
(131)sprintf(buf,"/proc/%d",pid)
open the proc file
(132)fd=open(buf,WRITE);
use signal sets where signal_set contains a list of signals to stop on
(133)ioctl(fd,PIOCSTRACE,signal_)
or use fault sets where fault_set contains a list of faults to stop on
(134)ioctl(fd,PIOCSFAULT,fault_set)
close the file descriptor
(135)close(fd)

Step 130 gets the process id or pid. The process id is a unique numeric identifier for a given process on the operating system. If the application supports enabling itself to freeze if it encounters an exception, then it can use it's own pid, otherwise this method can be done by an external process. If this is being done by an external process, the pid can be for any process which the calling process has permission to modify these attributes for. Step 131 creates the string which contains the path name for the /proc file for the process with the pid from step 130. The string will be contained in the variable called "buf". Step 132 opens the /proc file with WRITE attributes. The /proc file system on Solaris contains a file (or directory depending on the version of Solaris) for each process on the system. These files can be opened and used to gather information for the process or control the process. Opening a file on Solaris returns a file descriptor which in this case is stored in the variable fd. Step 133 and 134 use ioctl with PIOCSTRACE or PIOCSFAULT. The ioctl system call can be used to send commands, or retrieve information for file descriptors which are associated with special files or devices. In this case, the ioctl system call is being used with the file descriptor obtained in step 132. The variables signal_set and fault_set contain a list of signal and faults respectively which the process will stop on if they are encountered. Either one can be used and have similar effects. Most users are more familiar with signals and it is expected that signals will be used more than faults.

Step 135 closes the /proc file.

At this point, the process corresponding to the file descriptor will stop on a set of signal or faults depending on which of the two was chosen.

Getting Process Status

This section illustrates pseudo code for the process monitor program for checking a process to see if it has stopped due to an exception.

Getting Process Status Pseudo Code

```

(140)pid=getnextprocess( )
# make a string with the /proc file name
(141)sprintf(buf,"/proc/%d",pid)
# open the proc file
(142)fd=open(buf,READ);
# get process information
(143)ioctl(fd,PIOCSTATUS,process_status)
(144) if (STOPPED_BECAUSE_OF_EXCEPTION
    (process_status))
{
notify_user( )
dump_information( )
}
# close the file descriptor
(145)close(fd)
```

Step 140 is the same as step 130 (except done for an external process)

Step 141 is the same as step 131

Step 142 opens the /proc file with READ attributes. For this step the /proc file is opened with READ permission because we are not controlling the process, but only getting information for it.

Step 143 uses ioctl with PIOSTATUS. The PIOSTATUS command for ioctl returns the process's current status information.

Step 144 uses the process's status stored in the variable process_status and checks to see if the process has stopped due to an exception. If the process has stopped due to an exception, it can notify the user and dump information if configured to do so. Dumping information involves using another ioctl with a file descriptor opened for the process's /proc file.

Step 145 closes the /proc file

Getting Process Information

This section describes the method of getting information about the process. It is an explanation of how the dump_information function works for step 144. On Solaris, there are a number of simple and convenient tools under the usr/proc/bin directory which can be used to display information about a process. Tools like these may not be available on other unix-based operating systems. On operating systems which do not supply these types of tools, other methods of gathering information about the process would be used as may be appreciated by those skilled in the respective operating systems.

Getting Process Information Pseudo Code

```

(150)pid=getstoppedprocessid( )
# make a string with the /proc file name
(151)sprintf(buf,"/proc/%d",pid)
# open the proc file
(152)fd=open(buf,READ);
# get process information
(153)ioctl(fd,PIOCSTATUS,process_status)
(154)ioctl(fd,PIOCPSINFO,process_info)
(155)close(fd)
(156)sprintf(cmd_buf,"/usr/proc/bin/pstack
    %d>pstack.%d",pid,pid)
(157)system(cmd_buf)
(158)sprintf(cmd_buf,"/usr/proc/bin/pmap %d>pmap.%d",
    pid,pid)
(159)system(cmd_buf)
(160)sprintf(cmd_buf,"/usr/proc/bin/pflags
    %d>pflags.%d",pid,pid)
(161)system(cmd_buf)
```

Step 150 is the same as step 140

Step 151 is the same as step 141

Step 152 opens the /proc file with READ attributes. For this step the /proc file is opened with READ permission because we are not controlling the process, but only getting information for it.

Step 153 uses ioctl with PIOSTATUS. The PIOSTATUS command for ioctl returns the process's current status information.

Step 154 uses ioctl with PIOCPSINFO. The PIOCPSINFO command for ioctl returns miscellaneous information for the process.

Step 155 closes the /proc file

Step 156 creates a string which contains the path of the "pstack" command on Solaris and has the process id of the stopped process as the argument. The command output is saved in a file called pstack.<pid> where <pid> is the process id of the stopped process. The pstack command displays the process's function call stack.

Step 157 runs the pstack command.

Step 158 creates a string which contains the path of the "pmap" command on Solaris and has the process id of the stopped process as the argument. The command output is saved in a file called pmap.<pid> where <pid>is the process id of the stopped process. The pmap command displays the process's memory map.

Step 159 runs the pmap command

Step 160 creates a string which contains the path of the "pflags" command on Solaris and has the process id of the stopped process as the argument. The command output is saved in a file called pflags.<pid> where <pid> is the process id of the stopped process. The pflags command displays various information about the process's current status.

Step 161 runs the pflags command

Discussion of Utilities that May be Used in the Embodiment of the Invention Described Above The utilities that may be used in implementing the invention include the following programs:

Watch, the monitor program that monitors for stopped processes; and if needed,

Freeze, a utility program that can assist an application to support freezing.

The freeze utility can be used to enable a process to stop or freeze if it encounters an exception. Normally a process on Solaris and other Unix-like or Unix based systems will receive a signal such as SIGSEGV, SIGILL or SIGBUS if they encounter an exception. The process will then either die immediately or if it took previous precautions by installing a signal handler, the signal handler will be called. The signal handler usually dumps information such as a stack trace, machine registers, etc.

Sometimes the process may be in such a serious state that it cannot dump any information at all. In this case even if the signal handler is called, information will not be dumped and the cause of the exception will not be discoverable.

Reproducing an exception in a debugger can be difficult, particularly in database applications which can potentially have hundreds or thousands of processes running on a system. Without knowing which process is going to encounter an exception, a debugger may have to be attached to each process in order to catch the problem and gather more information. This is not practical with hundreds or thousands of processes.

Often a debugger is not available, or access to the system is not possible, so attaching a debugger is not an option and information about the cause of the exception becomes more difficult to obtain. Consider a worst case scenario where there are thousands of processes, an exception which causes a process to not dump information and a developer without access to the system.

The utilities would offer a solution to these problems. By running the freeze utility on a live DBMS instance, or setting the watch environment variable for instance in the DBMS if available, a process which receives an exception stops or freezes instantly. In fact, it stops on the exact machine instruction which caused the exception. This means that the signal handler is not called and the process does not become aware that it has received an exception. If nothing else is done, the process will remain in this state until the computer system involved is rebooted.

An external application such as a debugger can be attached at any time after the process has stopped. It may be difficult to find the process that has stopped as the DBMS may not be aware of the stoppage. The watch (monitor) program is used to watch for processes that have stopped because of the encounter of an exception. The external application or debugger can be run if given the process id (pid) of the process which stopped due to an exception occurring. A notification such as an e-mail note can also be sent to any interested parties when a process stops because of an exception.

For situations where a developer and a debugger are available, the watch (monitor) program can be configured to just display the "pid" (process id) of the process which has stopped. The debugger can then be attached to the process and begin analysis of the exception. As may be seen a single debugger can be used to take care of many processes. One debugger is not needed for each process.

If running a debugger is not an option, the watch program can be configured to dump information about the process which trapped, such as information ranging from a stack trace to all of the virtual memory used by the process can be dumped. A directory called "output" can be created under the current directory where all of the information is placed for convenience. This information can be packaged and sent to a developer for analysis. As this information is likely highly compressible, the information can be sent back to developer fairly conveniently in compressed form.

What is claimed is:

1. A method of investigating the operation of processes of an application program running on a multitasking operating system of a computer system to determine if any of said processes have stopped for a predetermined exception incident, comprising:

identifying to said operating system a plurality of predetermined exceptions to be investigated, wherein the predetermined exceptions are associated with the processes;

instructing said operating system to stop one of the processes when that process encounters one of said predetermined exception incidents, wherein if the process has an associated file in a process file system, the process is started with an environment variable set to indicate use of the file and wherein the process is stopped using the file;

scanning said computer system periodically for stopped processes;

determining whether a stopped process has been identified as having encountered a predetermined exception incident, wherein if the process has the associated file, using the file to determine whether the process encountered the predetermined exception incident; and performing a predetermined action if said stopped process has encountered a predetermined exception incident.

2. The method of investigating the operation of processes of an application program in accordance with claim 1 wherein said scanning is resumed after sending a notification.

3. The method of claim 2 including instructing said application program or operating system to stop a process from running if the process encounters an exception.

4. The method of claim 2 wherein said operating system continues a process that has stopped without encountering any of said predetermined exceptions.

5. The method of claim 4 wherein said predetermined action includes any of the following:

notifying a user of said exception incident, notifying another program of said exception incident, starting another program, dumping information relating to said exception incident encounter to another program or file, or restarting said process.

6. The method of claim 5 wherein said another program is a debugging program.

7. An article of manufacture comprising computer-readable media encoded with code of one or more computer programs for investigating the operation of processes of an application program running on a multitasking operating system of a computer system to determine if any of said processes have stopped for a predetermined exception incident, wherein the code is capable of causing operations, the operations comprising:

identifying a plurality of predetermined exceptions to be investigated, wherein the predetermined exceptions are associated with the processes;

instructing said operating system to identify one of the processes that has stopped when that process encountered one of said predetermined exception incidents, wherein if the process has an associated file in a process file system, the process is started with an environment variable set to indicate use of the file and wherein the process is stopped using the file;

scanning said computer system periodically for stopped processes;

determining whether a stopped process has been identified as having encountered a predetermined exception incident, wherein if the process has the associated file, using the file to determine whether the process encountered the predetermined exception incident; and performing a predetermined action if said stopped process has encountered a predetermined exception incident.

8. The article of manufacture of claim 7 wherein scanning is adapted to cause resumption of scanning after sending a notification.

9. The article of manufacture of claim 8 further comprising operations for instructing said application program or operating system to stop a process from running if the process encounters an exception.

10. The article of manufacture of claim 8 further comprising operations for permitting said operating system to continue a process that has stopped without encountering any of said predetermined exceptions.

11. The article of manufacture of claim 10 wherein said predetermined action includes any of the following:

notifying a user of said exception incident, notifying another program of said exception incident, starting another program, dumping information relating to said exception incident encounter to another program or file, or restarting said process.

12. The article of manufacture of claim 11 where said another program is a debugging program.

* * * * *